Dec. 16, 1930.   J. W. SMITH   1,785,686
SPRING END CONNECTION
Filed June 9, 1928
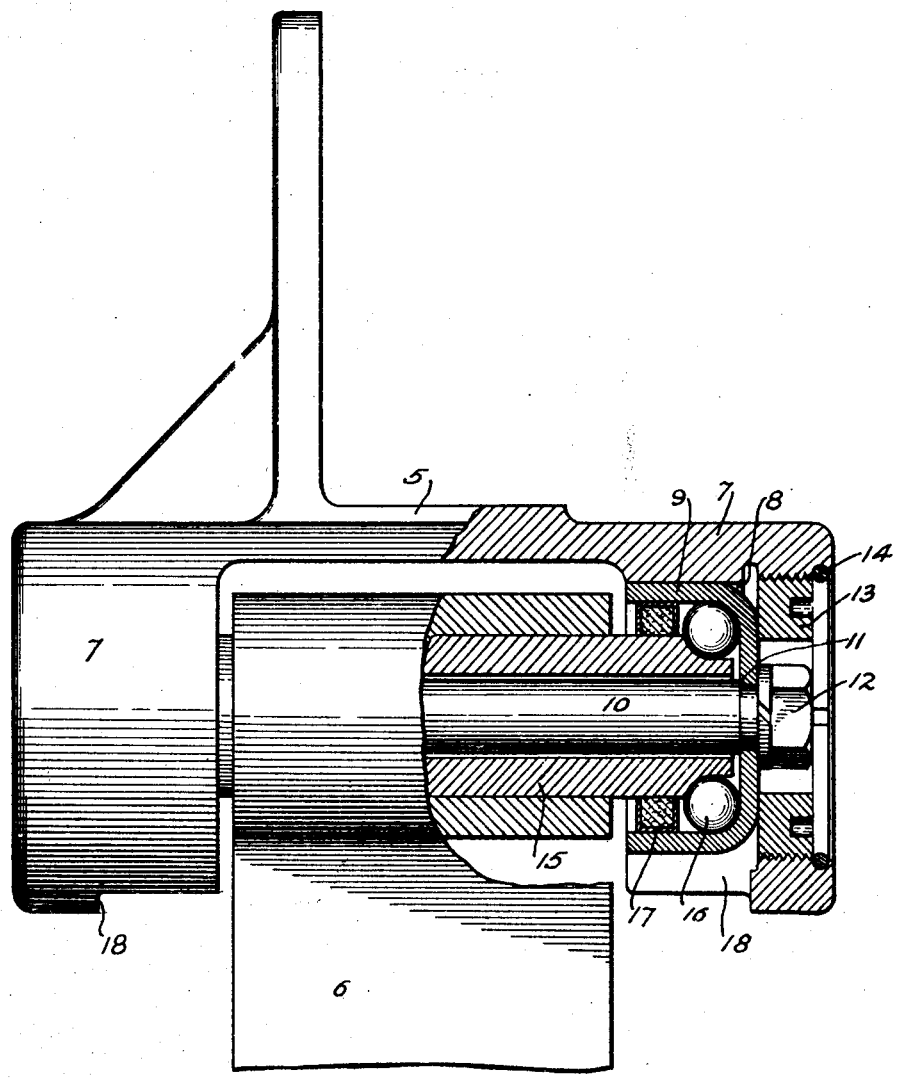
INVENTOR
John W. Smith
BY
Mitchell Bechtot
ATTORNEYS.

Patented Dec. 16, 1930

1,785,686

UNITED STATES PATENT OFFICE

JOHN W. SMITH, OF NEW BRITAIN, CONNECTICUT, ASSIGNOR TO THE FAFNIR BEARING COMPANY, OF NEW BRITAIN, CONNECTICUT, A CORPORATION OF CONNECTICUT

SPRING-END CONNECTION

Application filed June 9, 1928. Serial No. 284,189.

My invention relates to a spring end connection for connecting the frame and spring of a vehicle.

It is an object of the invention to provide a spring end connection, which is simple in construction, cheap to manufacture, which is readily assembled and disassembled, and in which parts may be made readily interchangeable. In general, the object is to provide a generally improved spring end connection.

Briefly stated, in a preferred form of the invention, I provide bosses either directly on the frame or spring of a vehicle, but preferably on a separate bracket, which may be attached to the spring or frame, preferably the latter. Antifriction bearing raceway means are seated in the bosses, and these raceways are connected together and definitely spaced apart by means, independent of the bosses, such as a through bolt extending from one raceway means to the other. Suitable means, such as plugs in the ends of the bosses, may hold the raceway means against axial displacement in the bosses. The other member to be connected, as the spring, is provided with complementary bearing member raceways, the raceways of which are spaced a definite distance apart. Antifriction bearing members, such as balls or rollers are interposed between complementary raceways.

In the drawing which shows, for illustrative purposes only, a preferred form of the invention, I have illustrated an end view of part of a spring and frame or bracket, parts being shown in section the better to illustrate the invention.

In said drawing, 5 indicates a frame or preferably a bracket to be secured to a frame or spring, preferably to the frame, while 6 indicates a spring. The bracket 5 is provided with bosses 7—7, only one of which need be described in detail, since the two bosses and parts contained therein are preferably duplicates of each other. Each boss is provided with a bore 8 for receiving an antifriction bearing member raceway means such as a bearing cup 9 seated therein.

The raceway means in the two bosses are connected together and definitely spaced apart from each other by means independent of the bosses. In the form shown, I employ a through bolt 10 provided at each end with a definite shoulder 11, which may abut the inside of each bearing member raceway or any part carrying the same. The through bolt preferably extends through apertures in the cups 9, and is provided at opposite ends with nuts 12, or usually a head and a nut. The spaced apart bearing rings 9 are held in the bosses 7—7 against axial displacement by any suitable means such as screw plug 13, which may be locked by means of a spring ring 14.

The member to be connected to the bracket 5 (in this case the spring 6) is provided with antifriction bearing member raceway means, and in the form shown I employ a tubular pin 15 secured in the spring eye in any suitable manner (not shown), or it may be secured by means of a shrink fit. The tubular pin 15 encircles the through bolt 10, and is preferably freely movable therein. The pin 15 carries antifriction bearing member raceways at its projecting ends, and in the form shown these raceways are formed directly upon the pin ends and engage antifriction bearings, such as balls or rollers 16—16 seated in the raceways 9. Dust rings as 17 may be provided for excluding dust from and retaining lubricant in the bearings.

Each boss may be slotted, as indicated at 18, to permit the transverse entry of the pin 15 into the position shown in the drawing. The spring end connection may be very readily assembled. The pin 15 is passed through the slots 18—18 substantially into the position shown. The bearing raceways 9—9 are then passed inwardly through the bores in the bosses 7—7, and the nut or nuts such as 12 on the through bolt 10, are drawn up so as to cause the raceways 9—9 to engage the shoulders 11 and be thus definitely spaced apart and held in relative position.

By making the pins with the shoulders 11 on opposite ends a definite distance apart, the bearing portions of the raceways 9—9 are automatically spaced a definite distance apart. By spacing the raceways on the pin means 15 a definite distance apart, as may be readily done, the antifriction bearing members 16 will be seated on the complementary raceways with just the desired tightness when the nuts 12 are drawn up tight. The plugs 13 or other positioning means merely serve to position the spring end and all bearings in the desired location relatively to the bracket 5. It will be seen that all parts may be manufactured under factory supervision, and that there may be free interchangeability of parts, thus facilitating quantity production.

While the invention has been described in considerable detail, I do not wish to be strictly limited to the form shown, since changes may be made within the scope of the invention as defined in the appended claims.

I claim:

1. In a spring end connection, a bracket having spaced apart seats thereon, raceway members in said seats, antifriction bearing members for said raceway members, means having complementary raceways engaging said antifriction bearing members, means independent of said bracket for connecting said raceway members in said seats for definitely spacing the same apart, and means for supporting said raceway members in said seats axially thereof.

2. In a spring end connection, a bracket having spaced apart seats, antifriction bearing member raceways for said seats, antifriction bearing members on said raceways, tubular means having antifriction bearing member raceways engaging said antifriction bearing members, and means extending through said tubular means for spacing said raceway members seated in said seats definitely apart independently of said bracket.

3. In a spring end connection, a bracket having bosses thereon, antifriction bearing member raceway means for said bosses, antifriction bearing members on said raceway means, means having complementary antifriction bearing member raceways engaging said antifriction bearing members, a through bolt having shoulders at opposite ends thereof engaging the antifriction bearing member raceway means in said bosses for definitely spacing said antifriction bearing member raceway means in said bosses, and means on said bolt for holding said raceway means in engagement with said shoulders.

4. In a spring end connection, a bracket having spaced apart bosses, antifriction bearing member raceway means for said bosses, a through bolt having integral shoulders at opposite ends thereof engaging said antifriction bearing member raceway means for definitely spacing the latter apart, antifriction bearing members seated on said raceways, and means having complementary antifriction bearing member raceways thereon engaging said antifriction bearing members.

5. In a spring end connection, a bracket having spaced apart bosses, antifriction bearing member raceway means for said bosses, a through bolt having shoulders thereon for definitely spacing said antifriction bearing member raceways apart, means for holding said raceways against axial movement in said bosses, and tubular means having complementary antifriction bearing member raceways engaging antifriction bearing members on said first mentioned raceway means.

6. In a spring end connection, a bracket having spaced apart bosses, antifriction bearing member raceway means for said bosses, a through bolt having integral shoulders engaging said antifriction bearing member raceways for definitely spacing the latter apart, and a tubular pin surrounding said through bolt and having antifriction bearing member raceways on the outside thereof and engaging antifriction bearing members on said first mentioned raceways.

7. In a spring end connection, a bracket having spaced apart bosses thereon, antifriction bearing member raceway means for said bosses, means independent of said bosses for connecting said raceway means and definitely spacing the latter apart, antifriction bearing members on said raceway means, means extending between said raceways and having antifriction bearing member raceways thereon engaging said antifriction bearing members, and means carried by said bosses for definitely positioning said raceway means therein.

8. In a spring end connection, a bracket having spaced apart bosses, antifriction bearing member raceways seated thereon, a through bolt having shoulders thereon engaging said antifriction bearing member raceways for definitely spacing the latter apart, plugs in said bosses for positioning said antifriction bearing member raceways axially of said bosses, and tubular pin means surrounding said through bolt and having antifriction bearing member raceways thereon engaging antifriction bearing members on said first mentioned raceways.

9. In a spring connection, a bracket having spaced apart seats thereon, raceway members on said seats, means extending between said raceway members for definitely spacing the latter apart, means on said bracket for holding said raceway members thereon so definitely spaced apart, antifriction bearing members on said raceway members, and means having raceways complementary to said first mentioned raceway members and engaging said antifriction bearing members.

10. In a spring connection, a pair of raceway members, means connecting said raceway members to each other and definitely spacing the same apart, supporting means for said raceway members, antifriction bearing members on said raceway members, and means interposed between said raceway members and having raceways thereon complementary to said raceway members and engaging said antifriction bearing members.

11. In a spring connection, a pair of raceway members, means connecting said raceway members to each other and definitely spacing the same apart, supporting means for said raceway members, antifriction bearing members on said raceway members, and means having raceways complementary to said raceway members and engaging said antifriction bearing members.

JOHN W. SMITH.